(No Model.) 2 Sheets—Sheet 1.

J. C. HORSTMEIER.
SAWING MACHINE.

No. 538,041. Patented Apr. 23, 1895.

WITNESSES:— INVENTOR:—
L. I. Van Horn. J. C. Horstmeier
Chas. B. Mann Jr. By Chas. B. Mann
ATTORNEY.

(No Model.) 2 Sheets—Sheet 2.

J. C. HORSTMEIER.
SAWING MACHINE.

No. 538,041. Patented Apr. 23, 1895.

WITNESSES :—
L. I. Van Horn.
Chas. B. Mann Jr.

INVENTOR :
J. C. Horstmeier
By Chas B. Mann
ATTORNEY.

UNITED STATES PATENT OFFICE.

JOHN C. HORSTMEIER, OF BALTIMORE, MARYLAND.

SAWING-MACHINE.

SPECIFICATION forming part of Letters Patent No. 538,041, dated April 23, 1895.

Application filed October 20, 1894. Serial No. 526,441. (No model.)

*To all whom it may concern:*

Be it known that I, JOHN C. HORSTMEIER, a citizen of the United States, residing at Baltimore, in the State of Maryland, have invented certain new and useful Improvements in Sawing-Machines, of which the following is a specification.

This invention relates to certain new and useful improvements in machines for resawing or splitting boards, and its object is to provide a simple and effective device for the purpose stated.

It is here contemplated to employ the improved sawing machine in connection with planers of that class which plane the board on its two opposite sides and double tongue and groove it on its opposite edges. The board thus double tongued-and-grooved is passed through my improved resawing machine which re-saws or splits the board so as to form two thinner boards, each of which is tongued-and-grooved.

Figure 1:
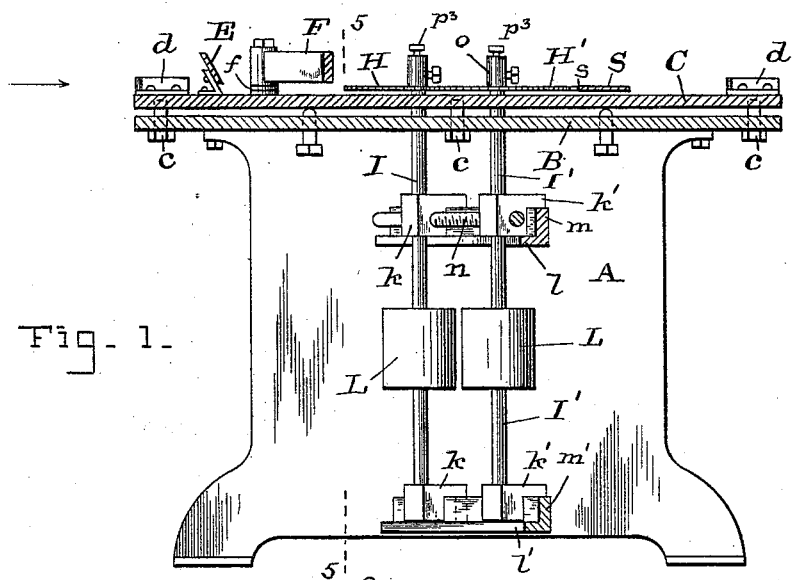
Figure 2:
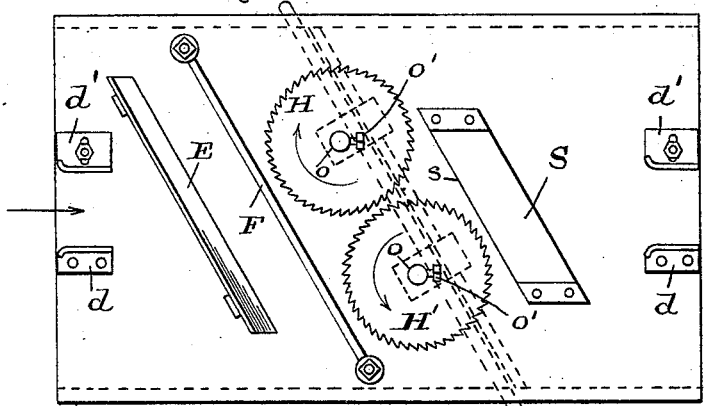
Figures 3, 4:
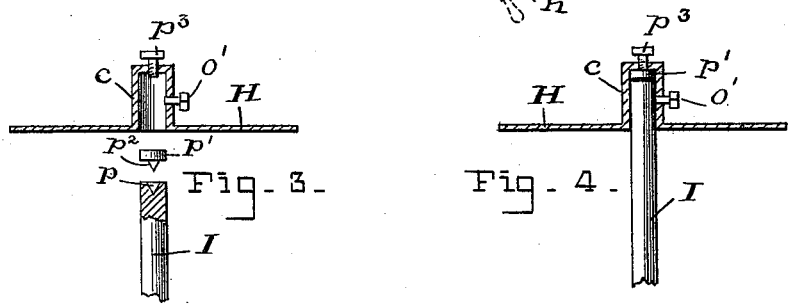
Figure 5:
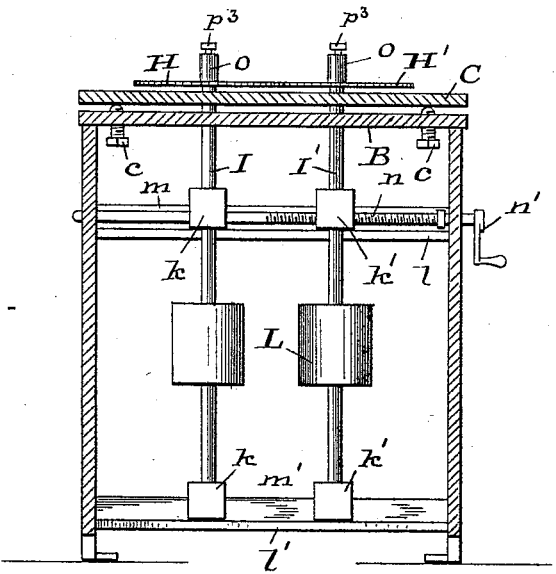
Figure 6:
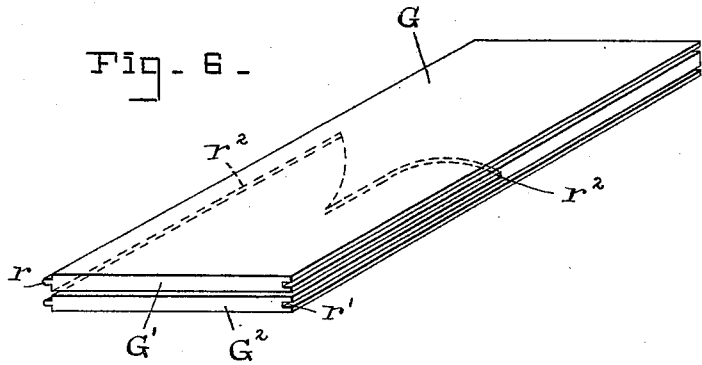

The invention is illustrated in the accompanying drawings, in which—
Figure 1 is an elevation view partly in section of the improved sawing machine. Fig. 2 is a top or plan view of the same. Figs. 3 and 4 are section views of a circular saw showing the means for adjusting it. Fig. 5 is a cross-section view of the machine on the line 5—5 of Fig. 1. Fig. 6 is a detail perspective view of a double-tongued and grooved board which has been partially re-sawed.

In the accompanying drawings, the letter, A, designates the frame of the improved sawing machine having a lower stationary table or bed, B, and an upper table or bed, C, which is adjustable with respect to said stationary table by means of set-screws, c, arranged at each side of the stationary table and entered at the lower side and projecting upward.

The adjustable table, C, is provided at each end with guide-plates, $d$, $d'$, between which the boards are to pass, one of these plates, $d'$, being adjustable to and from the other guide-plates, $d$, whereby said plate may be set to admit and guide boards of different widths. Adjoining the feed-guide at the entrance or feeding-in end of the machine, is a transverse inclined guide-plate, E, whose function is to guide or deflect the forward end of a board as it is fed in so that the board will pass below the said plate and thereby be directed down onto the surface of the table, and to hold the board down onto said surface.

A diagonal clearance bar, F, is provided to remove any sawdust or dirt which may adhere to the top surface of the board, G, which is to be sawed, so that said dirt will not interfere with the sawing operation or come into contact with the circular saws, H, H'. This clearance bar has position on the table, C, in rear of the guide-plate, E, and in advance of the said circular saws and may be adjusted vertically by means of suitable washers, $f$, arranged as shown so as to suit different widths of boards. As the board which is being sawed moves along the table the bar scrapes or removes the sawdust and dirt therefrom and the effect of the diagonal disposition of the lower edge of the bar is to conduct the dirt or sawdust to one side of the table out of the way of the board so that it will not deface the lumber or come into contact with and clog or choke the saws.

The two circular saws, H, H', are horizontal and are mounted upon the upper ends of vertical shafts, I, I', which are journaled at their lower ends in bearings, $k$, $k'$. The two bearings, $k$, of one shaft, I, are stationary and are secured upon the front side of two diagonal cross-bars, $l$, $l'$, below the table top and having position one below the other on the frame, A, while the two bearings, $k'$, of the other shaft, I', are movable on slideways, $m$, $m'$, and are also secured on the said diagonal cross-bars. Thus the vertical shaft, I', bearing the movable saw, H', may be adjusted to or from the fixed shaft, I, bearing the saw, H, by means of a screw-shaft, $n$, which turns in bearings in the frame and engages a female screw in the bearing, $k'$. At one part the screw is not threaded and this part passes freely through the bearing, $k$. By operating the crank-handle, $n'$, of this screw the lateral adjustment of the movable saw, H', with respect to the stationary saw, H, is effected. The advantage of securing the bearings, $k$, $k'$, of both circular saws at one side of the diagonal bars, $l$, $l'$, is that said bars serve as a backing or reinforce to stay the bearings when strain comes upon the circular saws during the operation of re-sawing a board.

The circular saws, H, H', are provided with means to adjust them vertically on their shafts with respect to the table top, C, so that boards of different thicknesses may be sawed. Each saw has a cap-hub, o, provided with a set-screw, o', whereby it is secured upon the upper end of the vertical shafts. The saw has a hub, o, provided on the side with a set-screw, o', whereby it is secured and held from turning on the upper end of the vertical shaft and closed at top by a cap, o², which seats down upon the upper extremity of the shaft and serves to hold or support the saw on said shaft, the extremity of which fits down into this indentation, as indicated in Fig. 3. When it is desired to raise the saws, one of these disks, p', is employed on the upper ends of the vertical shafts as shown in Fig. 4, thereby making the shafts that much higher and consequently preventing the cap-hub, c, of the saw from setting down so low with respect to said end and to the table, C. These disks may be made of different thicknesses, as one-sixteenth, one-eighth, or one-fourth of an inch, to adjust the height of the saws so as to resaw boards of different thicknesses. A set-screw, $p^3$, is provided on the cap-hub for delicate adjustment where a disk could not be used.

The board, G, to be re-sawed is ordinarily formed, as hereinbefore stated, by a suitable planing machine, with double-tongues, r, and grooves, r'. Such boards are then fed in through the feed-guides, d, d', and the circular saws, H, H', cut it as shown in Fig. 6, to form two boards each of which has a tongue and groove, the letter, $r^2$, indicating the kerf or cut of separation.

A separator bar or blade, S, is employed to take in the kerf and divide or spread the two thin sections of the board as they pass beyond the circular saws, H, H'. This separator blade has a diagonal position on the table, C, in rear of the said circular saws, and its front edge, s, is beveled or has a knife-edge. As the board, G, leaves the saws this beveled edge takes within the kerf, $r^2$, formed by the saws, and thereby spreads them apart. The lower board, G², passes beneath the separator blade or bar which holds it down onto the table, and between the two guide-plates, d, d', at the delivery end of the table, and the upper board, G', passes over the separator blade and also between the said guide-plates. The separator blade may be raised higher or lower with respect to the table, C, by means of washers (not shown) so as to suit different thicknesses of boards.

It will be seen that by means of the set-screws, c, the upper bed or table, C, of the frame, A, may be adjusted with respect to the circular saws, H, H', so that should one saw run out of true that side of the table at which it is mounted may be raised or lowered accordingly so that the board when placed thereon will so recline as to have proper relation with respect to said saw.

The shafts, I, I', are driven by means of belts passing around belt pulleys, L, on said shafts.

Having thus described my invention, what I claim as new, and desire to secure by Letters Patent, is—

In a sawing machine, the combination, with a frame, of a table adjustably seated above the top of the frame, two sets of guide blocks, an inclined guide plate adjacent to one of the sets of guide blocks, a pair of circular saws above the table, a clearance bar between the saws and the guide plate, and a separator bar between the saws and the other set of guide blocks, the guide blocks being in a line with each other and the inclined guide bar the guide plate, the saws and the separator bar all being substantially parallel with each other but inclined to a line through the sets of guide blocks, substantially as set forth.

In testimony whereof I affix my signature in the presence of two witnesses.

JOHN C. HORSTMEIER.

Witnesses:
JOHN T. GALVIN,
LOUIS H. SOUTHALL.